United States Patent [19]

Crase

[11] 4,198,104
[45] Apr. 15, 1980

[54] ADJUSTABLE STACKED BEARING ASSEMBLY

[75] Inventor: Gary M. Crase, Cypress, Calif.

[73] Assignee: Smith International, Inc., Newport Beach, Calif.

[21] Appl. No.: 914,271

[22] Filed: Jun. 9, 1978

[51] Int. Cl.² .................... F16C 17/04; F16C 19/04
[52] U.S. Cl. .................................. 308/139; 308/174; 308/230; 308/231
[58] Field of Search ............... 308/8.2, 135, 4 A, 139, 308/26, 219, 184, 161, 174, 163–172, 227–231, 189 A, 207 A, DIG. 11, DIG. 13, DIG. 15

[56] References Cited

U.S. PATENT DOCUMENTS

| 3,449,030 | 6/1969 | Tiraspolsky et al. | 308/230 |
| 3,894,818 | 7/1975 | Tschirky | 308/230 X |
| 3,982,797 | 9/1976 | Tschirky et al. | 308/139 |
| 4,029,368 | 6/1977 | Tschirky et al. | 308/135 X |

Primary Examiner—Douglas C. Butler
Attorney, Agent, or Firm—Philip Subkow; Bernard Kriegel; Newton H. Lee, Jr.

[57] ABSTRACT

An adjustable stacked bearing assembly has a plurality of bearing sub-assemblies interposed between thrust shoulders on a housing and a shaft extending through the housing, each bearing sub-assembly being individually adjustable or assembled in a condition in which all tolerance is eliminated. The bearings transmit thrust and radially center the shaft in the housing. The stacked bearing assembly is disclosed for use with a fluid pressure operated in-hole motor drill, the specific motor being shown as being of the helicoidal type.

17 Claims, 6 Drawing Figures

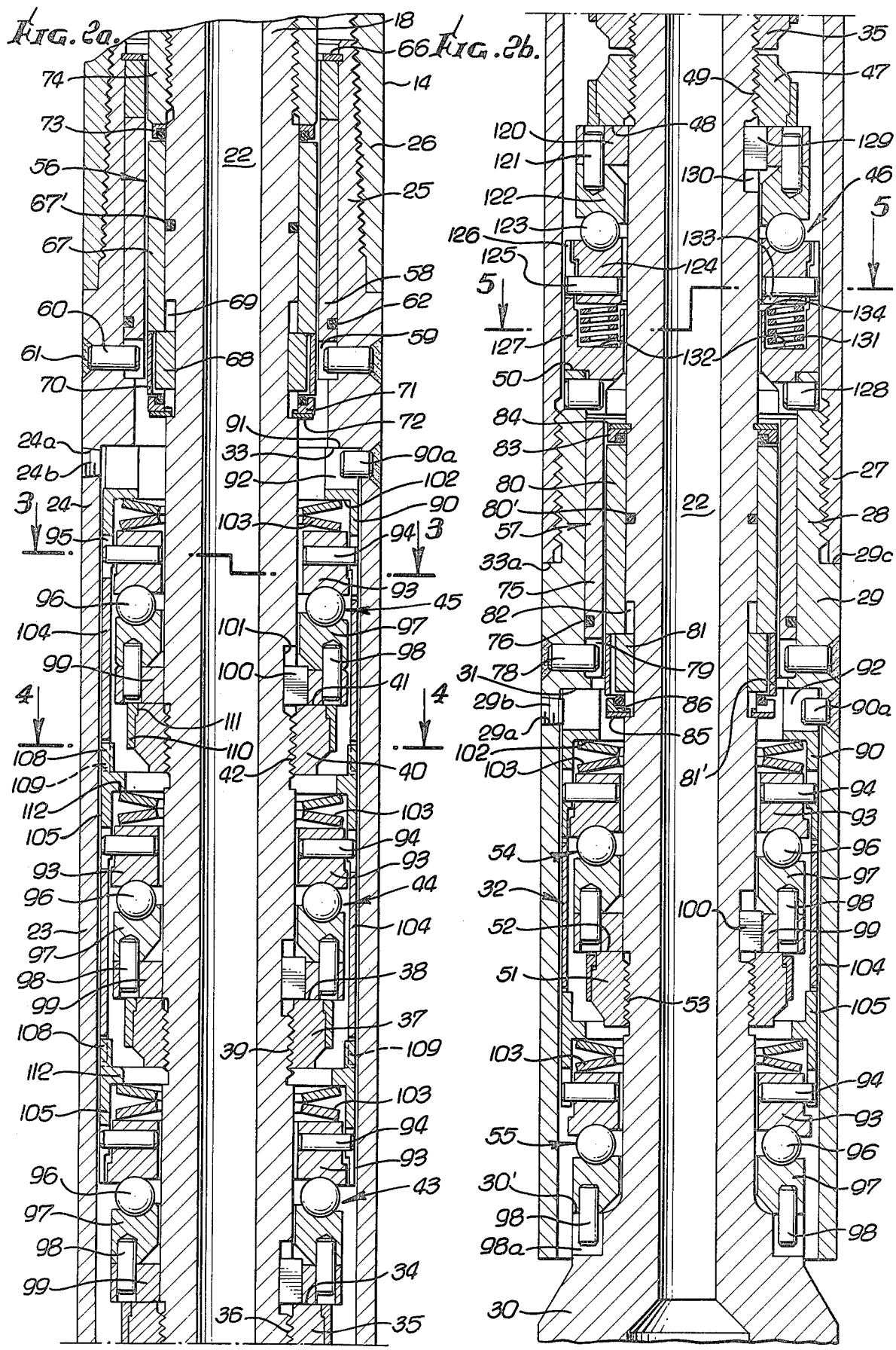

4,198,104

ADJUSTABLE STACKED BEARING ASSEMBLY

BACKGROUND OF THE INVENTION

In the manufacture and repair of the typical bearing assemblies for a shaft and housing through which high axial loads are imposed and radial forces are encountered, the cumulative tolerance attributable to manufacture of the various components has posed problems.

Particularly under circumstances when the bearing assembly operates in a hostile environment, such as the environment encountered when drilling bore holes in the earth, such as in well drilling, mining, pipeline installation, or the like, the cumulative manufacturing tolerance, as well as unequal wear of the parts has been a problem.

For example, in the drilling of bore holes in the earth using an in-hole fluid motor to drive a drill bit, the drill bit is attached to the shaft which is driven by the fluid motor. The shaft is hollow to allow the circulation of the drilling fluid through the motor to drive the shaft and through the shaft to the bit to flush cuttings from the bore holes and cool the bit. Whether the drilling fluid is gas, air, or liquid mud, the fluid contains very erosive particles which can cause bearing wear when the fluid flows through the bearings to also cool the bearings. In any event, the effective penetration of the drill bit through the earth formation is dependent upon the application of axial loading or weight on the bit cutters, the load or weight being transmitted to the drive shaft through the bearings from the housing. In such bearing assemblies, it is customary to employ spring elements to provide a spring cushion and absorb shock during operation of the drill.

When the bearings do not or cannot collectively transmit the load, and only certain bearings transmit all of the load excessive wear and ultimate destruction of the overloaded bearings may result. If the springs, due to tolerance, do not carry a proportionate share of the load, the overloaded springs may be destroyed resulting in excessive shock loading of the bearings. Such an event can cause cessation of the drilling operation and retrieval of the drilling apparatus for bearing repair, long before the drill bit may require change, and the drilling operation is thus terminated in an uneconomic period of time in the hole.

SUMMARY OF THE INVENTION

The present invention involves adjustably positioning the bearing sub-assemblies in a stacked bearing assembly whereby substantially to eliminate tolerance in the bearing sub-assemblies, so that each of them will transmit its share of the load between a relatively rotatable shaft and housing. Not only is the invention useful in eliminating cumulative manufacturing tolerances in the stacked bearing assembly, but also, the invention enables the bearing assembly to be maintained by taking up tolerance which occurs due to wear during use. Taking up the tolerance in the bearing sub-assemblies also assures that the cushioning springs are all active during use to cushion the shock loading caused during a drilling operation.

More particularly, the invention provides a stacked bearing assembly wherein a plurality of bearing sub-assemblies are disposed between a housing and a shaft, and, the sub-assemblies each include an adjustable stop or shoulder on the shaft movable towards and away from a shoulder in the housing, whereby the several bearing components can be moved into engagement with one another regardless of the tolerance between the parts, whether new or used.

The bearing sub-assemblies of the invention include thrust and radial bearings and springs between opposed shoulders, whereby axial load can be transmitted between the shaft and the housing of the assembly, shock and vibration are dampened, and the shaft is centralized in the housing.

The structure and arrangement of the stacked bearing assembly is such that the bearing sub-assemblies can be progressively installed on the shaft. A lower bearing group and an upper bearing group are adapted to transfer the force axially from the housing to the shaft in one direction, and another bearing, intermediate the upper and lower groups, is adapted to transmit force axially from the housing to the shaft in the other direction. The intermediate bearing is adjustable in the same manner as the other bearings and preloads springs which resiliently bias the shaft and housing in opposite directions.

Means are incorporated in the assembly, between the shaft and the housing to impede the passage of erosive fluid through the assembly.

This invention possesses many other advantages, and has other purposes and objects which may be made more clearly apparent from a consideration of a form in which it may be embodied. This form is shown in the drawings accompanying and forming part of the present specification. It will now be described in detail, for the purpose of illustrating the general principles of the invention; but it is to be understood that such detailed description is not to be taken in a limiting sense.

BRIEF DESCRIPTION OF THE DRAWINGS

FIGS. 2a and 2b, together, constitute a longitudinal section, as taken on the line 2—2 of FIG. 1, with certain parts in elevation, FIG. 2b being a downward continuation of FIG. 2a;

FIG. 3 is a transverse section on the line 3—3 of FIG. 2a;

FIG. 4 is a transverse section on the line 4—4 of FIG. 2a;

DESCRIPTION OF THE PREFERRED EMBODIMENT

Figure 1:
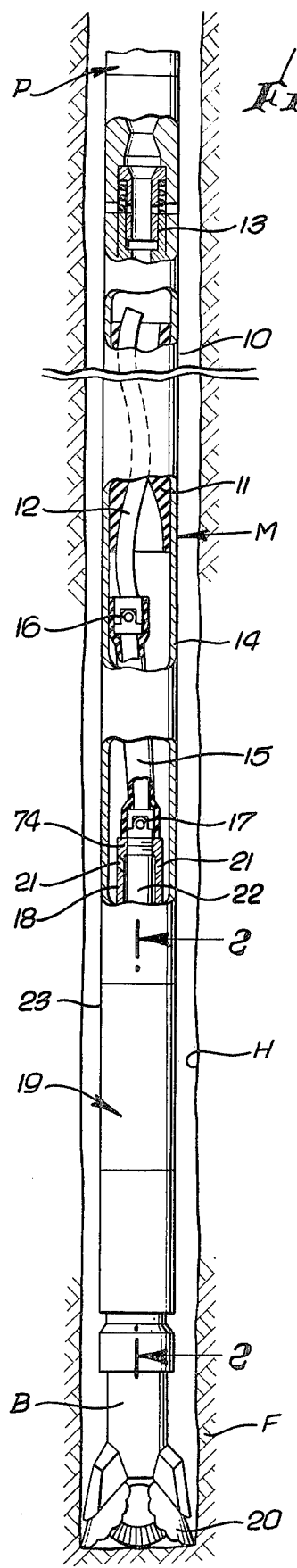
FIG. 1 is a view diagrammatically showing an in-hole motor drill, partly in elevation and partly in section, in an earth bore hole and incorporating an adjustable stacked bearing assembly in accordance with the invention.

As seen in the drawings, referring first to FIG. 1, an in-hole motor assembly M is connected to the lower end of a string of drilling fluid conducting drill pipe P and has its housing 10 providing a stator 11 for a rotatable helicoidal rotor 12. The rotor is driven by the downward flow of drilling fluid from the pipestring through the usual dump valve 13, the fluid passing downwardly through a connecting rod housing section 14 which contains a connecting rod assembly 15, connected by a universal joint 16 to the lower end of the rotor 12 and by a universal joint 17 to the upper end of a drive shaft 18. The drive shaft extends downwardly through a bearing housing 19, and at its lower end the drive shaft is connected to a drill bit B having cutters 20 adapted to drill through the earth formation F in the drilling of a bore hole H. The drive shaft 18 is tubular and has adjacent its upper end inlet ports 21, through which the drilling fluid passes from the connecting rod housing 14 into the elongated central bore 22 of the drive shaft, the fluid exiting from the bit B to flush cuttings from the bore hole and cool the bit.

During operation of the fluid motor M, the lower end of the rotor 12 has an eccentric motion which is transmitted to the drive shaft 18 by the universal connecting rod assembly 15, and the drive shaft 18 revolves about a fixed axis within the outer housing structure 23 of the bearing assembly 19, the drive shaft being supported within the housing, in accordance with the present invention, by the stacked adjustable bearing means, more particularly illustrated in FIGS. 2a and 2b. The cutters 20 of the bit B drill through the earth formation, in the drilling of the bore hole, at a rate determined by the speed of rotation of the drive shaft 18 and the axial force or weight applied to the cutters through the intermediary of the bearing housing. In the case of certain earth formations such as hard rock, the axial loading or force applied to the bit cutters is substantial, and therefore, the bearing means within the bearing assembly 19, through which the axial load is transferred from the housing 23 to the drive shaft 18 are subjected to severe axial loading, as well as to severe vibration and shock loading as the drill bit revolves on the bottom of the bore hole. In addition, the bearing means are subjected to severe radial loading, due to the high longitudinal force applied to the drive shaft, and as is well known, the bearing assemblies utilized in connection with motor drills, such as that shown in FIG. 1, must, therefore, be very durable. Since multiple radial and thrust bearings are generally employed between such a bearing housing and drive shaft, it is difficult, and as a practical matter impossible, to provide stacked bearing sub-assembly including shock absorbing spring elements, without tolerances if the sub-assemblies are installed between thrust transmitting shoulders of fixed spacing. This is due to the fact that the components of the various bearing sub-assemblies, even though fairly precision made, nevertheless have manufacturing tolerances which cumulatively result in unequal loading of the bearings, unequal action of the springs, resulting in excessive wear and heat of friction in the case of the overloaded bearings and overworked springs. When it becomes necessary to service a bearing assembly, to replace, at least, the excessively worn and/or the excessively overworked springs, with new bearings or new springs, the cumulative tolerance problem is further aggravated and in some instances it may even be necessary to replace the totality of the bearing sub-assemblies and springs to minimize the tolerance problem.

The present invention makes it possible to substantially eleminate all tolerance in each of the bearing sub-assemblies or units and in each of the cushioning spring sections of the respective bearing units, and, thereby, eliminating not only the tolerance in each sub-assembly, but also the possibility of cumulative tolerance. In addition, the bearing sub-assemblies being individually adjustable to eleminate tolerance therein, any worn components in any of the individual bearing sub-assemblies can be replaced with new components, and the resultant tolerances eleminated.

Referring to FIG. 2a, it will be seen that the bearing housing structure 23 includes an elongated tubular upper housing section 24 having a threaded upper pin end 25 engaged within the lower threaded box end 26 of the connecting rod housing 14. As seen in FIG. 2b, the lower internally threaded end 27 of the upper housing section 24 is connected to the externally threaded upper end 28 of a lower, downwardly extending bearing housing section 29. The drive shaft 18 extends longitudinally through the housing assembly and has a lower end 30 projecting from the lower end of the housing. This lower end 30 of the drive shaft is adapted to be connected to the bit B in the usual manner. On the enlarged lower end of the drive shaft is an upwardly facing shoulder 30' which is axially opposed by a downwardly facing internal shoulder 31 provided within the lower housing section 29. Located between the opposed shoulders 30' and 31 within the annular space defined between the drive shaft and the inside of the housing are lower radial and thrust bearing means 32 adapted to transmit axial load or weight from the shoulder 31 to the shoulder 30' in the operation of the motor drill of FIG. 1.

Referring to FIG. 2a, the upper housing section 24 will be seen to provide a downwardly facing internal shoulder 33 opposed by the upper end 34 of a nut 35 threaded onto the shaft 18 by a left hand thread 36. Spaced above the nut 35 is another nut 37 providing an upwardly facing end shoulder or surface 38 opposing the housing shoulder 33, this nut 37 being threaded onto the shaft 18 by thread 39. Between the nut 37 and the housing shoulder 33 is still another nut 40 providing an upwardly facing surface or shoulder 41 opposing the housing shoulder 33, this nut 40 also being threaded onto the shaft 18 by thread 42. Between the several upwardly facing shoulders 34, 38 and 41 and the downwardly facing shoulder 33 are respective radial and thrust bearing means 43, 44 and 45, which collectively provide an upper group of bearing means for transmitting axial load from the shoulder 33 of the housing to the drive shaft 18.

Referring to FIG. 2b, it will be seen that intermediate bearing means 46 are interposed between a nut 47 having a downwardly facing end surface providing a shoulder 48, the nut 47 being threaded at 49 onto the drive shaft 18, with the shoulder 48 opposing an upwardly facing shoulder 50 provided by the upper end of the threaded section 28 of the lower housing 29. The bearing means 46, in the use of the motor drill assembly of FIG. 1, constitutes an off bottom bearing, when the drill pipe string P is elevated and lifts the bit B off of the bottom of the hole, the drive shaft 18 then being supported upon the upwardly facing shoulder 50, while, for example, the drive shaft continues to rotate during continued circulation of the drilling fluid to flush cuttings from the bottom of the hole.

The lower bearing means 32 includes a nut 51 providing an upwardly facing end surface or shoulder 52, the nut being threaded at 53 onto the shaft 18 for adjustment towards or away from the downwardly facing lower body shoulder 30', to remove clearance from a bearing sub-assembly 54. Below the sub-assembly 54 is another bearing sub-assembly 55, which upon assembly of the apparatus, as will be later described, inherently has all clearance or tolerance taken up.

Bearing assemblies adapted to be employed with in-hole motors, as illustrated in FIG. 1, may be sealed and contain a lubricant, as more particularly disclosed in the prior U.S. Pat. No. 3,982,859 granted Sept. 28, 1976 to John E. Tschirky and Bela A. Geczy, for example, or means may be provided to enable a restricted flow of the drilling fluid through the bearing assembly for the purpose of lubricating and cooling the bearing assembly. The stacked bearing assembly of the present invention is illustrated as one wherein a quantity of the drilling fluid may flow through the assembly from the connecting rod housing 14, due to the differential pressure between the drilling fluid within the connecting rod housing and the drilling fluid in the bore hole H. This differential pressure is, ignoring dynamic and hydrostatic pressure differences, the difference caused by the restriction to the flow of fluid through the usual bit orifices. As herein illustrated, the upper end 25 of the upper bearing housing 24 houses upper flow restrictor means 56, and between the intermediate bearing means 46 and the lower bearing means 32 is a further flow restrictor means 57. The flow restrictor means 56 comprises an outer wear resistant sleeve 58 having notches 59 at its lower end, disposed in the upper end 25 of the body 24 and held against rotation therein by suitable pins 60 extending through the body wall and fixed in place as by welding at 61, the pins extending into the notches 59. A suitable O-ring seal 62 is disposed between the sleeve 58 and the body, and the sleeve is retained in body by an upper snap ring 66. Revolvable with the shaft 18 within the wear resistant sleeve 58 is a wear resistant sleeve 67 which is sealed at 67' and keyed to the shaft by suitable keys 68 and ways 69 in the shaft and retained in place by a retainer sleeve 70. At its lower end, the restrictor sleeve 67 abuts with a damper or spacer ring 71 which seats on a snap ring 72 in the shaft 18. At its upper end, the restrictor sleeve 67 is engaged by an upper spacer or damper ring 73 engaged by the lower end of a threaded connector end 74 which connects the universal joint 17 of the connecting rod assembly 15 to the drive shaft 18 and as seen in FIG. 1 contains the ports 21, whereby fluid is enabled to enter the drive shaft from the connecting rod housing.

The lower flow restrictor means 57 is similar in construction to the restrictor means 56 and includes an outer sleeve 75 sealed at 76 within the upper end section 28 of the lower body or housing 29 and held against rotation by the radial pins 78 extending inwardly from the sidewalls of the housing into notches 79 at the lower end of the outer sleeve 75. Mounted on the drive shaft is an inner wear resistant sleeve 80 sealed at 80' and keyed to the shaft by a key 81 engaged in a key way 82 and retained in place by a retainer ring 81'. The upper end of the restrictor sleeve 80 engages a damper ring 83 held against upward movement by a resilient snap ring 84, a similar snap ring 85 and damper 86 being at the lower end of the restrictor sleeve 80 to prevent downward movement thereof. Due to the differential pressure of fluid in the connecting rod housing entering the drive shaft 18 and in the annular space externally of the housing in a bore hole, a certain amount of the drilling fluid will be caused to flow between the upper flow restrictor members into the bearing assembly and through the lower flow restrictor members from the bearing assembly, affording a certain amount of lubrication and a cooling effect upon the bearing parts. Since the drilling fluid is quite erosive, the flow restrictor rings are adapted to resist wear by utilization of wear resistant materials such as tungsten carbide or alumina as more specifically described in the above-identified U.S. Pat. No. 3,982,859.

The present invention involves the construction of and the manner by which the various bearing sub-assemblies can be individually adjusted to eliminate tolerances, so that the longevity of the assembly in the hostile environment of drilling fluid or in any environment wherein minimum tolerance is desired or necessary.

Referring to FIG. 2a, it will be seen that the uppermost bearing sub-assembly 45 has an upper and outer thrust ring 90 providing an upwardly facing end shoulder 91 engaged with the downwardly facing shoulder 33 within the bearing housing 24. Notches 92 are provided in the thrust ring 90 for the reception of a locking pin 90a extending inwardly from the housing for interlocking engagement with the thrust ring to prevent relative rotation thereof. Axially shiftably disposed within the thrust ring 90 is an annular upper bearing race 93 having keys or pins 94 projecting radially into elongated slots 95 provided in the skirt of the thrust ring 90. Bearing balls 96 are engaged in an annular raceway in the lower surface of the bearing race 93 and in an opposing raceway in the upper surface of a lower bearing race 97. This lower race 97 is connected to the shaft 18 for rotation therewith by means of a number of circumferentially spaced pins 98 which engage in a thrust ring 99 keyed to the shaft by means of a key 100 engaging in a key way 101 provided in the shaft. Adjustor nut 40 engages beneath the thrust ring 99 and is adapted to be moved longitudinally of the shaft, upon rotation on the shaft, to eliminate the tolerance between the stack up of related parts. Adjustment of the nut is adapted to eliminate tolerance between a downwardly facing shoulder 102 on the thrust ring 90 and a stack of Belleville washer type springs 103 which are coengaged and engaged between the downwardly facing shoulder 102 and the upper surface of the upper bearing race 93. A spacer sleeve 104 extends downwardly from the lower end of the upper thrust ring 90 to the upper end of a subjacent thrust ring 105 which is disposed between the upper bearing sub-assembly 45 and the bearing sub-assembly 44 therebelow.

Figure 4:
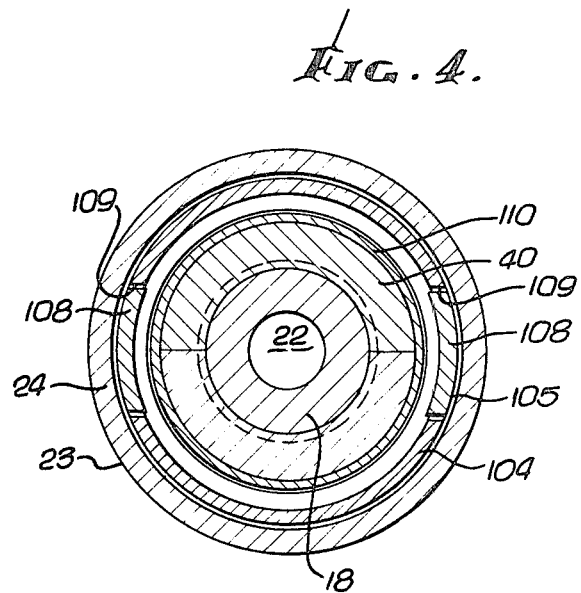
Figure 3:
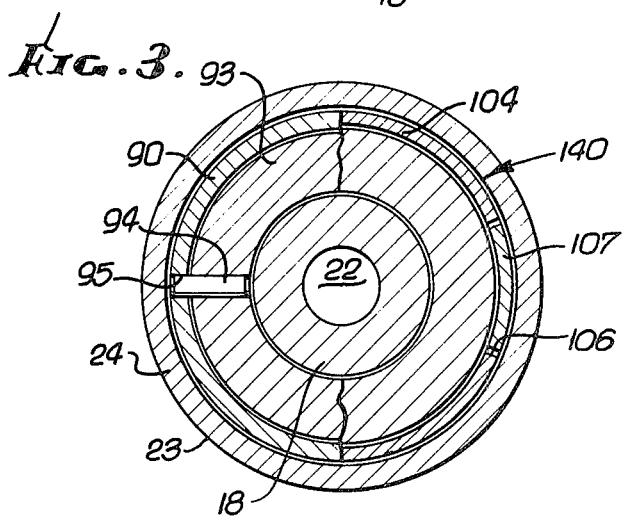
Figure 5:
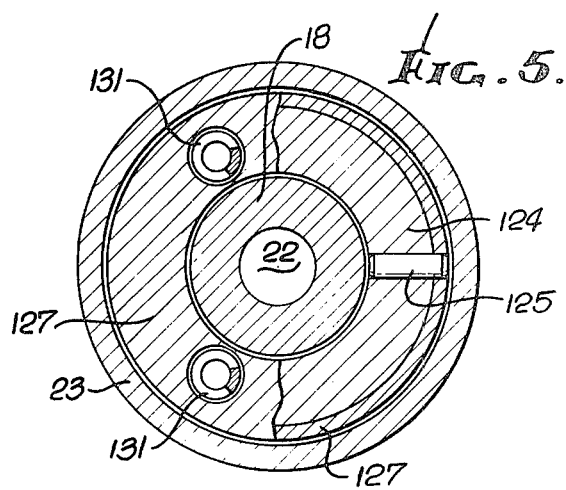
FIG. 5 is a transverse section on the line 5—5 of FIG. 2b.

Means are provided whereby the spacer sleeve 104, the upper thrust ring 90 and the lower thrust ring 105 are keyed together and connected to the housing section 24 by the pin means 90a referred to above. As seen in FIG. 3, to best advantage, the spacer sleeve 104 has a number of circumferentially spaced notches 106 which receive lugs 107 depending from the thrust ring 90. As seen in FIG. 4, to best advantage, the lower end of the spacer sleeve 104 and the lower thrust ring 105 are also provided with lugs 108 projecting upwardly from the thrust ring 105 to interfit with notches 109 on the lower end of the spacer ring 104. Thus, the upper and lower thrust rings 90 and 105 are keyed together by the spacer sleeve 104, but the thrust ring 105 is capable of axial adjustment to remove tolerances from the bearing sub-assembly 44.

As also best seen in FIG. 4, the adjuster nut 40, which is representative of all of the adjuster nuts for all of the bearing sub-assemblies, is in the form of a diametrically split nut assembly, the two halves of which can be applied laterally to the opposite sides of the drive shaft and then held together by a retainer ring 110 which can be moved axially over the split nut parts and has an internal flange 111, engaging with the nut to prevent downward movement of the retainer sleeve 110 from the interconnected nut sections.

The thrust ring 105 provides an internal flange 112 providing a downwardly facing shoulder opposing the upper surface of the upper ball race 93 of the bearing sub-assembly 44 and adapted to provide abutments for the stack of Belleville washers 103, in the same manner as the spring washers of the bearing sub-assembly 45.

The bearing sub-assemblies 44 and 43 are the same as the sub-assembly 45, specifically described above, so that further specific description of the respective bearing sub-assemblies is unnecessary. However, it will be noted that another spacer sleeve 104, like that previously described, is also disposed between the thrust ring 105 between the bearing assemblies 43 and 44, whereby the entire thrust ring and spacer sleeve assemblage extending longitudinally within the housing section 24 is keyed to the housing by the above-described pins 90a and individual adjustment of the respective adjuster nuts 40, 37 and 35 enables the bearing sub-assemblies to be individually adjusted in order to eliminate tolerance between the respective bearing races, bearing balls, springs and thrust sleeves, in a manner later to be described.

It will now be apparent, upon reference to FIG. 2b that the bearing sub-assembly 54 of the lower bearing means 32 is of the same construction as the bearing sub-assembly 45 described above, including the upper thrust ring 90, Belleville springs 103, engaged between the thrust ring 90 and the upper ball race 93 which is pinned by pins 94 to the thrust ring and engages bearing balls 96 which also ride in the lower bearing race 97 pinned by pins 98 to the lower thrust ring 99 which is keyed by the key 100 to the drive shaft 18. Here again, the adjuster nut 51 which is split as illustrated in FIGS. 4 in connection with the nut 40 can be axially adjusted to remove all of the tolerance. In this case, the spacer sleeve 104 is again keyed to the lower thrust ring 105 which is pinned to the upper bearing race 93 of the lowermost bearing sub-assembly, by the pins 94, and the lower race 97 is pinned by the pins 98 to the upwardly facing shoulder 30' provided adjacent the lower end of the shaft. No adjuster nut is necessary in the case of this lowermost bearing sub-assembly, as will be more particularly pointed out hereinafter.

As previously indicated, the bearing sub-assembly 46, as seen at the upper end of FIG. 2b, as distinguished from being adapted to transmit load axially from the housing to the shaft in a downward direction, is adapted to transmit upward thrust to the shaft upon elevation of the housing structure. Thus, the bearing sub-assembly 46 has the adjuster nut 47 providing the downwardly facing shoulder 48 which abuts with a thrust ring 120 pinned by pins 121 to an upper bearing race 122. This race 122 has bearing balls 123 engaged in its raceway, the balls also engaging in the raceway of a lower bearing race 124. The lower race 124 is provided with keys or pins 125 engaging in slots 126 in the upper end of an adaptor ring 127 which at its lower end is pinned by pins 128 to the upper end 28 of the lower housing section 29. Thus, it will be seen that the lower bearing race 124 is connected to the housing structure, while the upper race 122 is connected to the shaft by means of a key 129 engaged in a keyway 130 in the shaft. The lower bearing race 124, when the shaft is being loaded axially as illustrated in FIGS. 2a and 2b, is slightly floating within the upper portion of the adaptor ring 127 on a suitable plurality of circumferentially spaced compression springs 131 which engage in the bottom of seats 132 provided in the adaptor ring and engaged beneath the lower bearing race 124, to apply an upward bias. However, upon elevation of the housing structure the springs 131 can be compressed, enabling a downwardly facing shoulder 133 at the bottom end of the bearing race 124 to engage an upwardly facing shoulder 134 on the adapter ring 127, so that the load of the shaft 18 and the bit will be carried on the bearings 123, when the motor drill assembly of FIG. 1 is lifted to raise the bit off of the bottom of the bore hole H.

ASSEMBLY PROCEDURE

In order to assemble the stacked bearing assembly described above, the drive shaft is first suitably supported in an upright condition. The lowermost bearing sub-assembly 55 is first installed upon the shaft by successively lowering about the shaft the bearing races and balls 96, 97 and 93, pins 98a engaging in slots 98a; the springs 103 and the thrust ring 105 can then be lowered about the shaft to rest upon the bearing race 93. The split nut 51 can then be applied to the threads 53, and thereafter the bearing sub-assembly 54 lowered down about the shaft to rest upon the nut 51. With the nut 51 downwardly displaced on the threads, the thrust ring 99 can be elevated to a location enabling the insertion of the key 100, and then the nut can be approximately positioned on the shaft at the location shown in FIG. 2b. It will be noted that the weight of the components of the lowermost bearing sub-assembly 55, the spacer sleeve 104 of the bearing sub-assembly 54, as well as the thrust sleeve 90 of the sub-assembly 54 will inherently cause all of such components to be stacked one on the other without tolerance therebetween. However, the springs 103 of the bearing sub-assembly 54 may not be engaged beneath the downwardly facing shoulder 102, depending upon the position of the nut 51 on the shaft. If clearance exists, it is only necessary to elevate the thrust sleeve 104 to allow access to the nut 51 so that the latter can be adjusted on the shaft 18 so that all clearance between the springs and the bearing components is eliminated.

Then, the components of the flow restrictor means 57 which are carried by the shaft, namely the damper rings 83 and 86, the restrictor sleeve 80, the key or keys 81 and the respective snap rings 84 and 85 are installed on the shaft. The lower housing section 29 is then lowered downwardly over the shaft, with the components of the restrictor means 57 and the pins 128 installed therein, the downwardly facing shoulder 31 landing upon the upper surface of the thrust ring 90. The housing section 29 has a side opening 29a, later closed by a pipe plug 29b, through which an observation can be made to determine that the pin or pins 90a carried by the housing 29 are properly engaging within the notches 92 in the upper end of the thrust ring 90.

The off bottom or intermediate bearing means 46 is then installed. The adaptor ring 127 with springs 131 therein, bearing elements and drive ring 120 are lowered about the shaft and the adaptor engaged with drive pins 128. Key 129 is installed between the shaft and the drive ring 120. Split nut 47 is then applied to the shaft thread 49 and turned down against the upward bias of springs 131 to preload the springs, but without engagement of the shoulders 133 and 134 of the lower bearing race and the adaptor ring.

At this time, it is necessary to establish the proper location of the upwardly facing shoulder 91 on the upper thrust ring 90 of the bearing sub-assembly 45. One advantageous method for obtaining such a measurement is to insert into the upper housing section 24 a gage which can abut with the downwardly facing internal shoulder 33 and the lower extremity 33a (FIG. 2b) of the housing section 24. Since the lower end 33a of the housing 24 ultimately engages with the upwardly facing shoulder 29c on the lower body section 29 to limit downward movement of the upper body section as the threaded connection is being made up between the upper and lower body sections, it is apparent that the measurement taken by the gage is used to determine the vertical location at which the upwardly facing shoulder 91 on the upper thrust sleeve 90 of the upper bearing sub-assembly 45 is to be located.

The components of the several bearing sub-assemblies 43, 44 and 45 can then be lowered over the shaft 18, the respective drive keys 100 installed and the respective split nuts 35, 37 and 40 installed in a position approximating the location seen in FIG. 2a. Thereafter, the bearing sub-assemblies 45, 44 and 43 are successively adjusted. First, the split nut 40 is adjusted on its thread to position the upwardly facing shoulder 91 of the thrust ring 90 at the vertical location determined by taking the measurement referred to above. Adjustment of the nut 40 can be accomplished simply by elevation of the spacer ring 104 and thrust ring 90 to afford access to the nut. Next, the nut 37 is adjusted to remove all of the clearance from the elements of the bearing sub-assembly 44. Here again, the spacer sleeves and thrust rings can be elevated sufficiently to enable access to the nut 37 to accomplish the adjustment. The split nut 35 can then be adjusted on the shaft to remove tolerance from the bearing sub-assembly 43, in the manner described above with respect to bearing assemblies 45 and 44.

The shaft carried components of the flow restrictor means 56 are then assembled on the shaft 18, the ported connector 74 threaded onto the shaft, and the housing section 24 can then be lowered over the shaft with the flow restrictor components previously installed therein. The threaded connection between the upper and lower body sections can then be made up. The body 24 has a sight opening 24a, later closed by a pipe plug 24b enabling observation of the engagement of the drive pin or pins 93 in the upwardly opening slots 92 provided in the upper thrust ring 90 of the upper bearing assembly 45.

With the stacked bearing assembly assembled as described above, the resultant bearing assembly is one in which each of the individual bearing sub-assemblies is individually adjusted to remove all of the clearance therefrom, so that within the bearing assembly there is no cumulative clearance and each of the bearing units and the springs thereof are operable to support the shaft and housing for relative rotation and for thrust transmission. After some use, when the bearing assembly is broken down for inspection and service, any worn bearing components or spring components can be individually replaced and tolerance eliminated by adjustment of the respective split nut.

I claim:

1. A bearing assembly for use with a fluid motor having a stator and a rotor comprising: a shaft connectable at one end to said rotor; a housing about said shaft and connectable at one end to said stator; a plurality of bearing sub-assemblies in thrust transfer relation between said shaft and said housing to transmit thrust in one direction, each sub-assembly including means providing thrust transfer elements on said shaft and in said housing; and means axially adjustably mounting the respective thrust transfer elements on said shaft to eliminate clearance in the respective sub-assemblies; and including another bearing sub-assembly in thrust transfer relation between said shaft and said housing to transmit thrust in the other direction, said another sub-assembly having thrust transfer elements on said shaft and in said housing; means axially adjustably mounting said thrust transfer element of said another sub-assembly on said shaft to eliminate clearance in said another sub-assembly; said another sub-assembly including spring means preloading said first-mentioned sub-assemblies.

2. A bearing assembly as defined in claim 1; said first mentioned sub-assemblies also each having spring means for biasing said thrust transfer elements apart.

3. A bearing assembly as defined in claim 1; said thrust transfer elements on said shaft being split nuts threaded on said shaft and having means retaining said nuts about said shaft.

4. A bearing assembly as defined in claim 1; said first-mentioned sub-assemblies also each having spring means for biasing said thrust transfer elements apart, said thrust transfer elements on said shaft being split nuts threaded on said shaft and having means retaining said nuts about said shaft.

5. A bearing assembly as defined in claim 1, said housing having a joint between its ends, at least one of said first-mentioned sub-assemblies being located at opposite sides of said joint, and including radially opposed sleeves carried by said shaft and said housing at said joint.

6. A bearing assembly as defined in claim 1; including means between said shaft and said housing for impeding fluid flow therethrough including a pair of radially opposed circular surfaces on said shaft and in said housing defining a restricted flow path, said means for impeding flow being located between an axially spaced pair of said first-mentioned sub-assemblies.

7. A bearing assembly as defined in claim 6, said first mentioned sub-assemblies also each having spring means for biasing said thrust transfer elements apart.

8. A bearing assembly as defined in claim 7; said thrust transfer elements on said shaft being split nuts threaded on said shaft and having means retaining said nuts about said shaft.

9. A bearing assembly as defined in claim 1; said first mentioned sub-assemblies each including opposed bearing races having radial and thrust bearings therebetween, and means keying said races to said shaft and said housing.

10. A bearing assembly as defined in claim 1; said first mentioned sub-assemblies each including opposed bearing races having radial and thrust bearings therebetween, and means keying said races to said shaft and said housing, spring means between one of said races and one of said thrust transfer elements, and means shiftably supporting said one of said races on said one of said thrust transfer elements enabling relative axial movement to compress said spring means.

11. A bearing assembly for use with a fluid motor having a stator and a rotor comprising: a shaft connectable at one end to said rotor and having a fluid passage therethrough for the flow of motor fluid; a housing connectable at one end to said stator in fluid flow relation therewith to receive motor fluid from said stator; radial and thrust bearings between said shaft and said housing; flow restricting means between said shaft and said housing for diverting flow of motor fluid through said shaft passage; said thrust bearings including thrust elements on said shaft and in said housing opposed to one another and adjustable with respect to one another to eliminate clearance; certain of said thrust bearings transmitting thrust from said housing to said shaft in one direction and the other of said thrust bearings transmitting thrust from said housing to said shaft in the other direction; and spring means in one of said thrust bearings adjustably preloading the other thrust bearings.

12. A bearing assembly as defined in claim 11; said housing including a threaded joint; said thrust bearings including bearing units at opposite sides of said joint, and said flow restricting means including opposed sleeves carried by said shaft and said housing at said joint and providing a restricted flow path therebetween.

13. A bearing assembly as defined in claim 11; said thrust bearing being ball bearings having balls and races engaged to provide radial bearing support.

14. A bearing assembly as defined in claim 11; said thrust bearings being ball bearings having balls and races engaged to provide radial bearing support, said flow restricting means being opposed sleeves defining an annular restricted flow path therebetween.

15. A bearing assembly as defined in claim 11; each of said thrust bearings including a pair of opposed races, one race of each pair being keyed to said shaft, the other race each pair being in thrust transmitting relation with said housing, and including adjuster means for axially adjusting each race on said shaft to remove clearance as aforesaid.

16. A bearing assembly as defined in claim 11; each of said thrust bearings including a pair of opposed races, one race of each pair being keyed to said shaft, the other race each pair being in thrust transmitting relation with said housing, and including adjuster means for axially adjusting each said race on said shaft to remove clearance as aforesaid, and spring means interposed between each of said other races and said housing and adjustably preloaded upon adjustment of said one of said thrust bearings.

17. A bearing assembly comprising: a housing; a shaft rotatable in said housing; bearings between said shaft and said housing in thrust transmitting relation; said bearings including oppositely facing thrust members on said shaft and companion thrust members in said housing to transmit thrust in opposite directions; springs engaged with said thrust members, an adjustable connection between said shaft and the thrust members thereon enabling adjustment of opposed thrust members on said shaft and said springs towards the thrust members in said housing to remove clearance from said bearings and oppositely load said springs of said thrust members in said housing.

* * * * *